(12) United States Patent
Chen et al.

(10) Patent No.: US 9,723,946 B2
(45) Date of Patent: Aug. 8, 2017

(54) BEVERAGE TEMPERATURE OPTIMIZER MACHINE

(71) Applicant: ELECTRICAL & ELECTRONICS LTD., Hong Kong (CN)

(72) Inventors: Andrew Yuen Chin Chen, Hong Kong (CN); Amy Decem Cheng, Hong Kong (CN); Raymond Wai Ming Wong, Hong Kong (CN); Jeremy Kok Leong Tay, Hong Kong (CN)

(73) Assignee: ENE HOLDINGS LTD, Hong Kong (CN)

( * ) Notice: Subject to any disclaimer, the term of this patent is extended or adjusted under 35 U.S.C. 154(b) by 462 days.

(21) Appl. No.: 14/123,504

(22) PCT Filed: Oct. 9, 2013

(86) PCT No.: PCT/IB2013/059223
§ 371 (c)(1),
(2) Date: Dec. 2, 2013

(87) PCT Pub. No.: WO2014/057428
PCT Pub. Date: Apr. 17, 2014

(65) Prior Publication Data
US 2014/0318377 A1 Oct. 30, 2014

Related U.S. Application Data

(60) Provisional application No. 61/711,313, filed on Oct. 9, 2012.

(51) Int. Cl.
*A47J 31/46* (2006.01)
*A47J 31/10* (2006.01)

(52) U.S. Cl.
CPC ............... *A47J 31/46* (2013.01); *A47J 31/10* (2013.01)

(58) Field of Classification Search
CPC ........................................................ A47J 31/46
(Continued)

(56) References Cited

U.S. PATENT DOCUMENTS 1,748,135 A     2/1930   Kise
2,899,885 A * 8/1959   Thompson ............. A47J 31/10
                                                       210/413

(Continued)

FOREIGN PATENT DOCUMENTS

CN         1640349 A     7/2005
DE       29812794 U    12/1998

(Continued)

OTHER PUBLICATIONS

Apr. 3, 2014 PCT International Search Report, Int'l App'l No. PCT/IB2013/059223.

(Continued)

*Primary Examiner* — David Angwin
*Assistant Examiner* — Amit K Singh
(74) *Attorney, Agent, or Firm* — Law Offices of Albert Wai-Kit Chan, PLLC

(57) ABSTRACT

A beverage machine that heats up water in the upper water chamber(s) is provided. The water has direct contact with an electric heating system and the heated water flows by gravity and being distributed by a pour over system into an underlying filter basket. The hot water chamber has a sensor for water temperature. Once the water reaches an optimal temperature, a motor and gear system would drive a valve open and allow the heated water to flow into the underlying filter basket. A specific amount of water can be heated up in individual batch, thereby making it easy to manage water temperature in every batch.

9 Claims, 8 Drawing Sheets

(58) Field of Classification Search
USPC .................. 99/304, 305, 306, 307, 300, 315
See application file for complete search history.

(56) References Cited

U.S. PATENT DOCUMENTS

| | | |
|---|---|---|
| 4,094,233 A | 6/1978 | Martin |
| 2007/0181004 A1 | 8/2007 | Hale |

FOREIGN PATENT DOCUMENTS

| | | |
|---|---|---|
| GB | 2411577 A | 9/2005 |
| JP | 2002336129 A | 11/2002 |
| WO | 2014057428 A2 | 4/2014 |

OTHER PUBLICATIONS

Apr. 3, 2014 Written Opinion, Intl App'l No. PCT/IB2013/059223.
Jul. 4, 2016 Extended European Search Report, EP13845217.2.

\* cited by examiner

BEVERAGE TEMPERATURE OPTIMIZER MACHINE

CROSS-REFERENCE TO RELATED APPLICATIONS

This application is the National Stage of International Application No. PCT/IB2013/059223, filed Oct. 9, 2013, which claims priority of U.S. Ser. No. 61/711,313, filed Oct. 9, 2012. The entire disclosures of the preceding applications are hereby incorporated by reference into this application.

FIELD OF THE INVENTION

This invention relates to an automatic drip type coffee machine or beverage machine.

BACKGROUND OF THE INVENTION

A drip type coffee maker is one in which coffee brew is obtained by a single pass of hot water through a quantity of coffee grounds. The hot water flowing to and through the coffee grounds may be intermittent rather than continuous. Also, the output temperature of the small amount of cold water withdrawn from the water tank and heated up by the heater is uncontrollable. This may cause the water temperature inside the carafe or thermal jug to be not hot enough, especially the first few cups. Moreover, if a user only needs to brew 4 cups of coffee using the 10-12 cups drip type coffee maker, they need to brew 10-12 cups because it is understood that the temperature of the first few cups from the 10-12 cups drip type coffee machine is not hot enough. Due to intermittent flow of hot water and uncontrollable small amount of cold water withdrawn from the water tank and heated up by the heater, distribution of hot water on coffee grounds would be uneven and with limited spread out areas, thereby resulting in coffee that is poorly extracted, less flavorful and aromatic.

For the above reasons, the present invention improves and rearranges the conventional drip type coffee machine construction in order to improve the temperature of the coffee, especially the first few cups. In this invention, the beverage machine can provide coffee or other beverages at an optimal temperature (FIG. 1). The water tank and heating system are placed on top of the machine in order to minimize any energy loss via the piping and tubing of pumps. In one embodiment, the hot water will be dispensed into the filter basket directly via a pour-over system that provides even water distribution on the coffee grounds.

SUMMARY OF THE INVENTION

One objective of this invention is to reduce temperature fluctuation, achieve optimal water temperature or manage water temperature, thereby serving a better tasting beverage such as coffee or tea.

For conventional drip type coffee makers, the coffee temperature from the initial brewing period is always too low (average below 75° C.). In contrast, the present invention ensures optimal coffee temperature even in the first few cups. Moreover, this invention eliminates many problems commonly found in most drip type coffee maker such as excessive steam, energy loss, and inconsistent brewing time. The present invention minimizes any potential impact to brewing time due to calcification, or even minimizes calcification.

The present invention is designed to improve beverage temperature without affecting the overall brewing time. For the existing drip type coffee machines, it is very hard to control output temperature or ensure temperature consistency (some variance or some fluctuation would happen in every brewing process) because they are using the traditional heating systems which are always positioned at the bottom of the machines. These heating systems heat and pump out hot water from the bottom to the top via a lot of pipes and tubes. In this way, significant amount of energy loss would happen during the process. The new system in this invention can produce hot coffee or other hot beverages at an optimal temperature in a simple and efficient way and energy (such as heat) loss is minimized during the brewing process. In one embodiment, after the optimal temperature is reached and detected by a temperature sensor, a valve will open to dispense the hot/warm water into an underlying filter basket by gravity. For example, in the default position, a piston valve opens a flow path between the cold water chamber and the hot water chamber but closes the flow path between the hot water chamber and the filter basket. In this embodiment, the user can fill up both the cold water and hot water chambers at the same time. After the user turns on the machine, the water inside the hot water chamber would be heated up. Once the water inside the hot water chamber reached the optimal temperature, the heater would be turned off and the piston valve would be pushed upward. As a result, the flow path between the cold water chamber and the hot water chamber would be closed, whereas the flow path between the hot water chamber and filter basket would be opened to dispense the hot water into the underlying filter basket by gravity. When the hot water chamber is being emptied, the temperature sensor detects a drop to certain pre-determined temperature, and the gear system starts to operate and moves the piston valve back to the default position. At the same time, the piston valve opens the flow path between the cold water chamber and the hot water chamber but closes the flow path between the hot water chamber and the filter basket to allow cold water to fill up the hot water chamber for the next batch of heating up or brewing.

The above heating process is accomplished by a unique structure of water container which is positioned on the top of the machine. When the water reaches its desirable temperature and comes into contact with ground coffee or tea leaves, a carafe collects end beverage being dripped from the filter basket. In this way, the end beverage temperature in the carafe or thermal jug can be more stable or significantly improved. The quality of the extracted coffee or tea would also be more consistent or significantly improved.

For machine with smaller capacity, the water container will only have one section because only hot water chamber is required. If the machine is bigger, the water container will be separated into two or more sections: cold water chamber(s) and hot water chamber(s). In one embodiment, a certain amount of water is heated and contained inside the hot water chamber. A valve system between these chambers limits the quantity of cold water flowing from the cold water chamber into the hot water chamber. In this way, a certain amount of water is heated in individual batch, which allows for easy management of time and water temperature in individual batch. Consequently, user waiting time is reduced and the user can choose to produce less amount of beverage.

According to various coffee authorities around the world, including the Specialty Coffee Association of America (SCAA), the Specialty Coffee Association of Europe (SCAE) and the European Coffee Brewing Centre (ECBC), the optimal coffee brewing and extraction temperature ranges from 92° C. to 96° C. This invention provides a brewing system that can comply with this requirement consistently.

In one embodiment, there is provided a brewing machine comprising (a) one or more cold water chambers and one or more hot water chambers, the cold water chambers are attached to the hot water chambers, and the water chambers are located on top of the machine; (b) a filter basket located beneath the hot water chamber(s); and (c) a valve controlling water flow (i) between the cold water chamber(s) and the hot water chamber(s) and (ii) between the hot water chamber(s) and the filter basket. In one embodiment, the hot water chamber(s) comprises a temperature sensor and a heating system. In another embodiment, the temperature sensor turns the heating system on or off at pre-determined temperatures.

In one embodiment, when the valve opens a flow path from the cold water chamber(s) to the hot water chamber(s), water flow from the hot water chamber(s) to the filter basket is stopped. Both the cold and hot water chambers can then be filled up with water. In another embodiment, when the valve closes a flow path from the cold water chamber(s) to the hot water chamber(s), water is allowed to flow from the hot water chamber(s) to the filter basket.

In one embodiment, the valve is a piston valve. In another embodiment, the valve is controlled by a gear system comprising one or more cams. In one embodiment, the gear system rotates under the control of a motor gear system comprising a motor, a micro switch, and gears. In one embodiment, the motor gear system begins to rotate at the same time when the heating system is turned on or off. In another embodiment, the motor gear system stops rotating when the micro switch is hit by a cam of the gear system.

In one embodiment, the cold water chamber(s) of the above brewing machine is/are placed on top of the hot water chamber(s). In another embodiment, water flows from the cold water chamber(s) to the hot water chamber(s) by gravity. In yet another embodiment, heated water flows from the hot water chamber(s) to the filter basket by gravity.

In one embodiment, the heated water from the hot water chamber(s) is evenly distributed and spread all over the coffee grounds in the filter basket via a pour over system. For example, once the water is heated to a desired temperature in the hot water chamber(s), the heated water would be dispensed in a continuous flow to a pour over system. The pour over system would distribute and spread the heated water all over the coffee grounds in the filter basket.

DETAILED DESCRIPTION OF THE INVENTION

Figure 1:
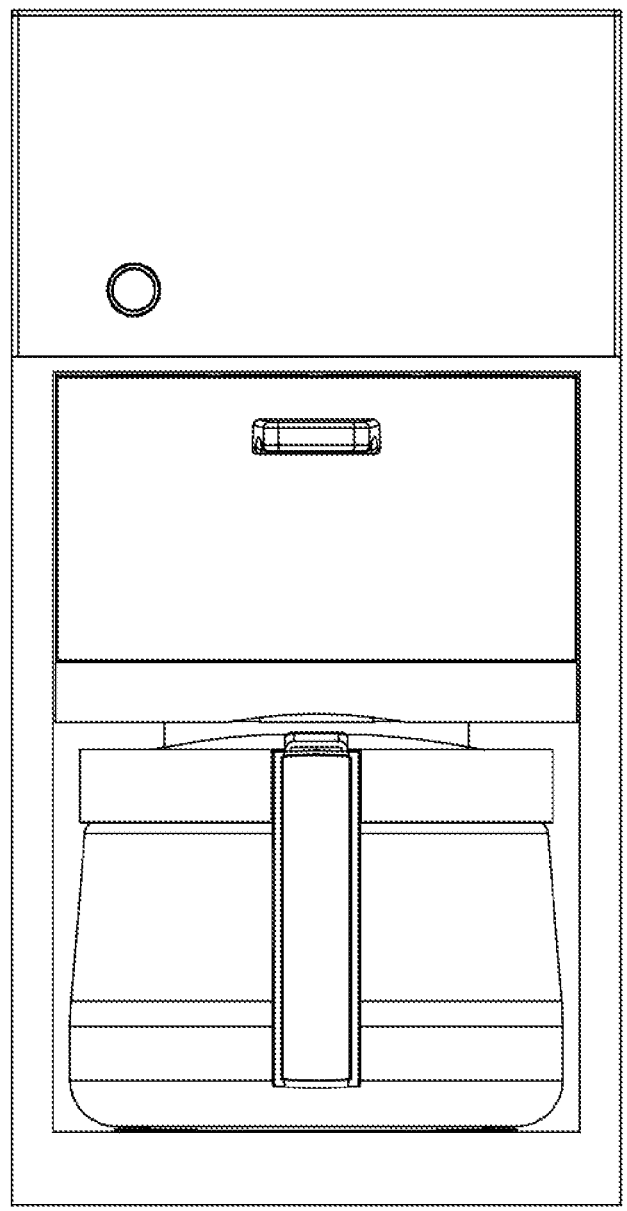
FIG. 1 shows the front view of one embodiment of this invention.
Figure 2:
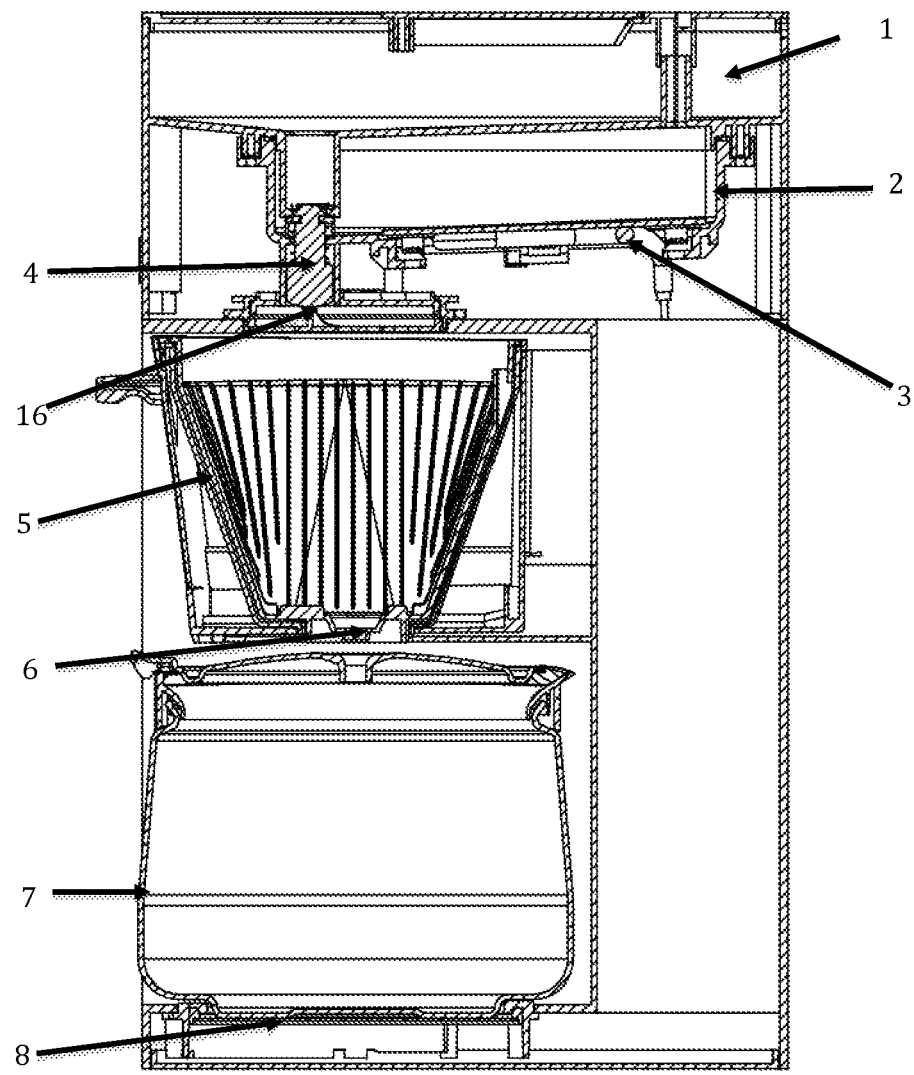
FIG. 2 shows a side section view of one embodiment of this invention.
Figure 3:
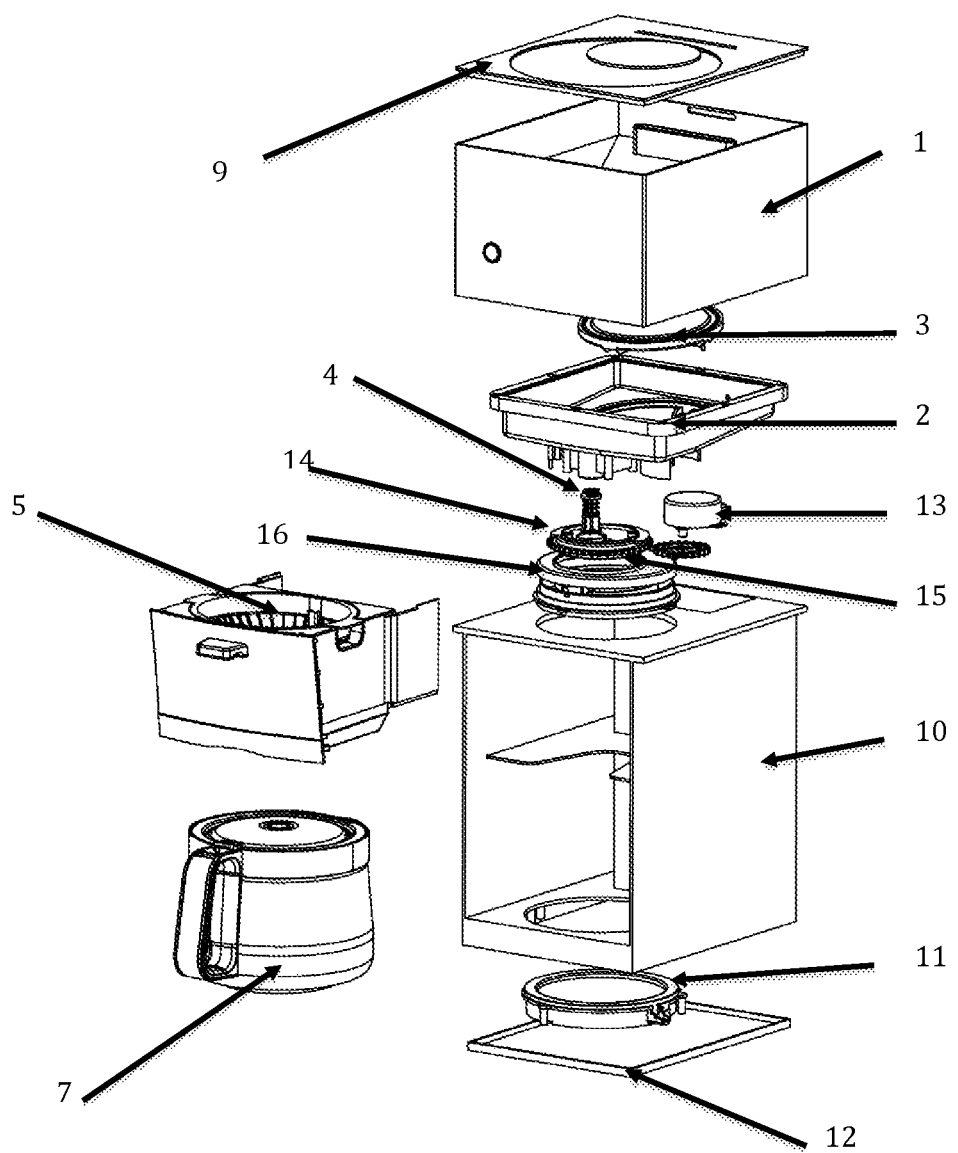
FIG. 3 shows an exploded perspective view of one embodiment of this invention.

The configuration of one embodiment of this invention is shown in FIGS. 1-3. A water tank sits at the top of the machine and a filter basket is located underneath the water tank. A cup, mug or glass carafe or thermal jug is placed underneath the filter basket. In one embodiment, only one button is required to turn on and off the machine.

In one embodiment, a body (10) supports one or more cold water chamber or water supply chamber (1) which is connected to the hot water chamber (2). In between these chambers (1) & (2), there is a piston valve (4) that controls water flow from the cold water chamber (1) to the hot water chamber (2). The default position of this piston valve (4) opens a flow path from the cold water chamber (2) to the hot water chamber (1) but closes a flow path from the hot water chamber to the filter basket. A user pours cold water into the cold water chamber directly or via the top lid (9) and the cold water fills up all the chambers up to a maximum level. In another embodiment, there is only the hot water chamber (2) and water is poured directly into the hot water chamber.

Figure 4:
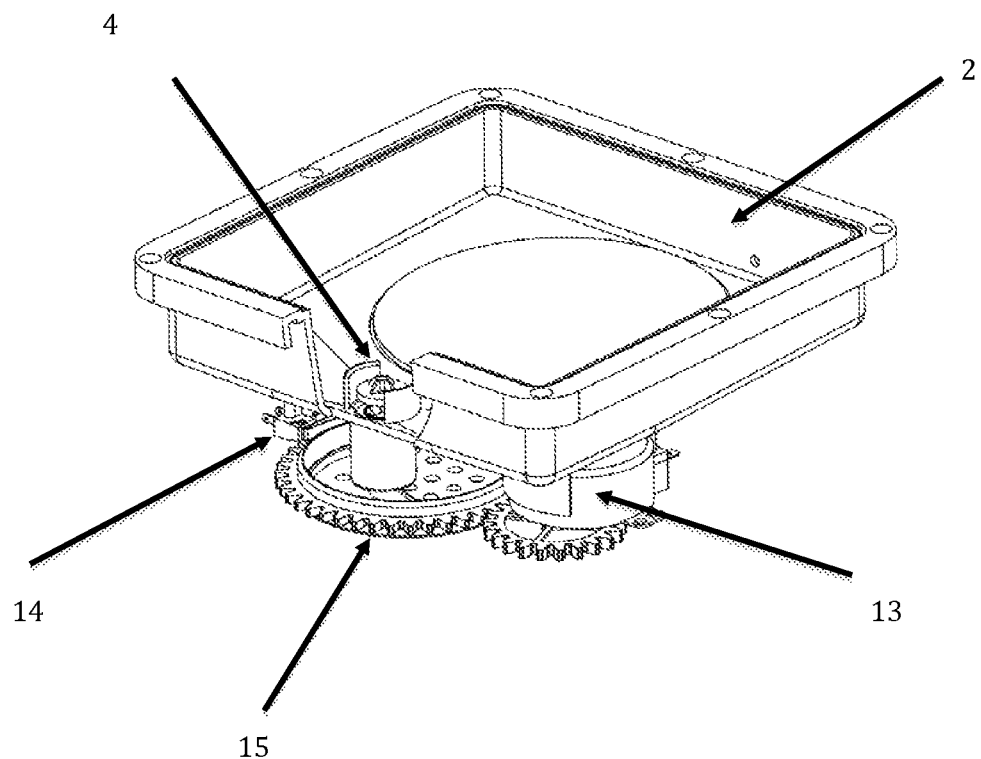
FIG. 4 shows an exploded perspective view of one embodiment of the piston valve and gear system.

In one embodiment, the machine is turned on by pressing an On/Off button. The heating system (3) will be turned on to heat up the cold water in the hot water chamber. An electronic temperature sensor built in the hot water chamber (2) monitors the water temperature. When the water reaches the optimal temperature, the heating system (3) will be turned off. The motor gear system (13) will begin to rotate the gear system (15). In one embodiment shown in FIGS. 4-6, the gear system (15) is designed with 2 separated cams, cam 1 is for activating the micro switch (14) and cam 2 is for activating the valve piston (4). Once the gear system (15) rotates to a proper position, cam 1 will activate the micro switch, the motor gear system (13) will stop rotating, and cam 2 on top of the gear system (15) will push the piston valve upwards at the same time. The flow path between the hot water chamber (2) and the filter basket (5) is thus opened and the heated water would flow gradually from the hot water chamber (2) through the pour over system (16) to the filter basket (5). Once all the heated water goes to the filter basket (5) and the hot water chamber (2) becomes empty, the electronic temperature sensor will detect a drop in temperature that re-activates the motor system (13) and gear system to restore the gear system (15) back to the default position, i.e. the piston valve (4) will open a flow path between the cold water chamber (1) and the hot water chamber and close the flow path between the hot water chamber (2) and the filter basket to allow cold water to fill up the hot water chamber (2) for the next batch of heating up or brewing.

The filter basket (5) includes a pause and serve valve (6) that enables liquid beverage to be stored in the basket (5). When the valve (6) is pushed open by the container (7), the liquid beverage (e.g. coffee or tea) would flow through the valve (6) into the container (7). The container may be a cup, mug or glass carafe or thermal jug. A keep warm heater (8) built inside of the keep warm plate (11) can be placed underneath the container (7) if a warming feature is required. The keep warm heater (8) is covered by a bottom cover (12).

The lid (9) placed on top of the water chambers is to cover the water chambers when the machine is in operation.

The heating system (3) can be any type of heating system generally known in the art. Similarly, any power can be used in the heating system according to what is known in the art.

The gear system (15) and motor gear system (13) can be produced in any kind of material. The main function of these gear systems is to open the piston valve (4). Moreover, cam 1 at the gear system and the micro switch act as a signal for the gear systems to turn on and off.

Figure 7A:
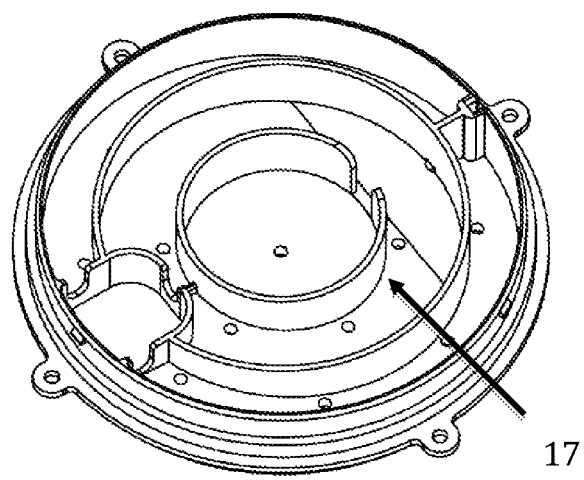
FIG. 7A shows one embodiment of a perspective view of pour over system.
Figure 7B:
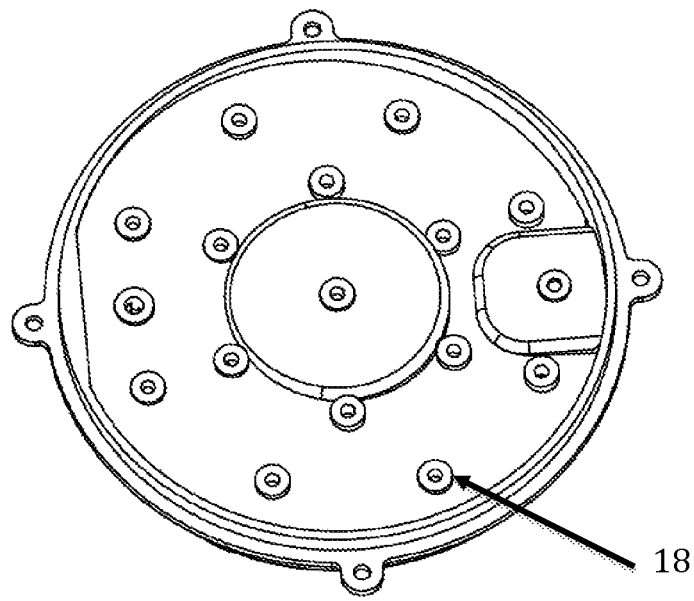
FIG. 7B shows one embodiment of another perspective view of pour over system.

FIG. 7 shows an embodiment of the pour over system (16). In one embodiment, the pour over system is located in between the hot water chamber(s) and the filter basket. In one embodiment, the pour over system comprises at least one dispensing channel (17), which guide(s) the flow of water from the hot water chamber to the filter basket, and at least one drain hole (18) that allows the flow of water to be dispensed and spread all over the coffee grounds in the filter basket. This ensures the ground coffees is mostly or completely wet, warmed, steeped and extracted. In one embodiment, the dispensing channel is contained in a circular piece. In another embodiment, the flow of the water in the dispensing channel can be in circular or any distributing forms. In one embodiment, the heated water is delivered to reach every surface or spot of ground coffee in the filter basket via the plurality of drain holes at the bottom surface of the pour over system. This is to ensure all surfaces or spots of ground coffee in the filter basket are well contacted with water. In one embodiment, each dispensing channel has at least one drain hole.

The pour over system is to replicate hot water pouring on ground coffee by a system instead of a person. The pour over system helps to improve some common inconsistencies with manual pour over, among them disorganized and inconsistent pours, and irregular extraction.

The pour over system (16) can be produced in any kind of material and shape. The main function of the pour over system is to distribute and spread heated water all over the coffee grounds in the filter basket.

In one embodiment, the pour over system (16) has at least one dispensing channel (17) with at least one drain hole (18). The dispensing channel (17) can be in any size or any shape.

One of ordinary skill in the art would readily configure the filter basket (5) to fit for any size or any shape of filters or tea container.

In the present invention, a cup, mug or glass carafe or thermal jug can be used as the container (7). When a glass carafe is used, a separated heating system may be required for the keep warm feature.

Figure 5A:
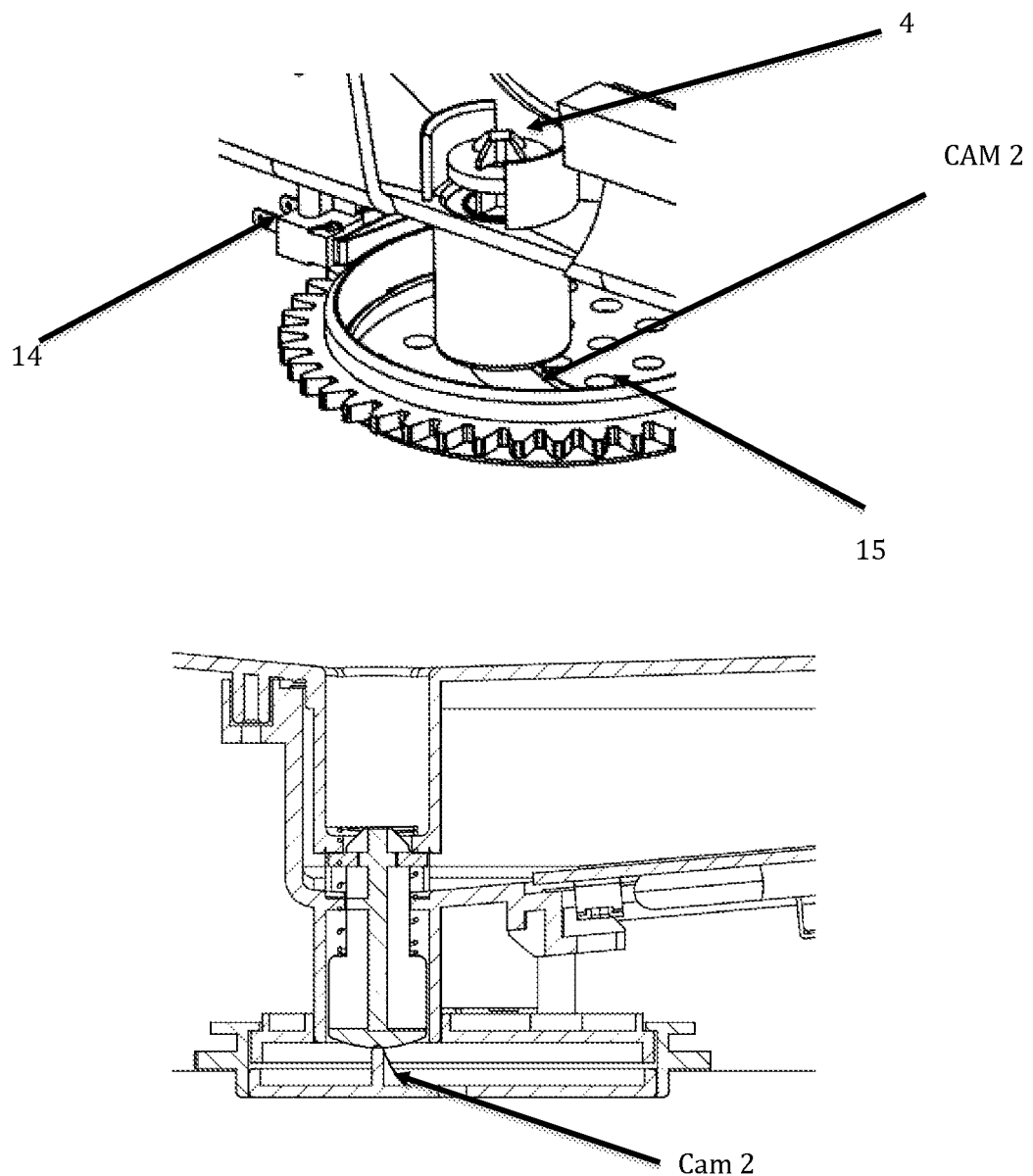
FIG. 5A shows one embodiment of the gear system when the valve closes (default position) the flow path from the hot water chamber to the filter basket.
Figure 5B:
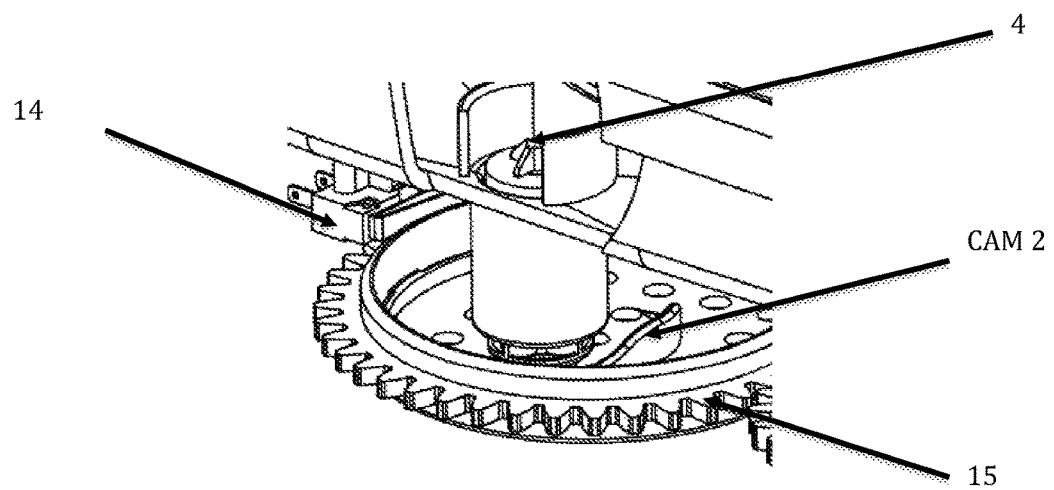
FIG. 5B shows one embodiment of the gear system when the valve opens a flow path from the hot water chamber to the filter basket.
Figure 5B:
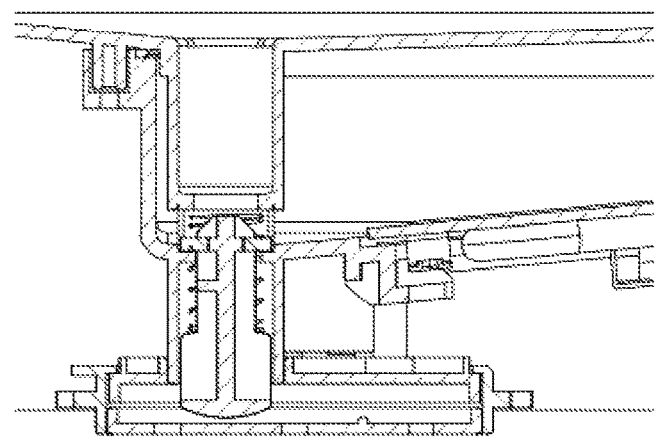
Figure 6:
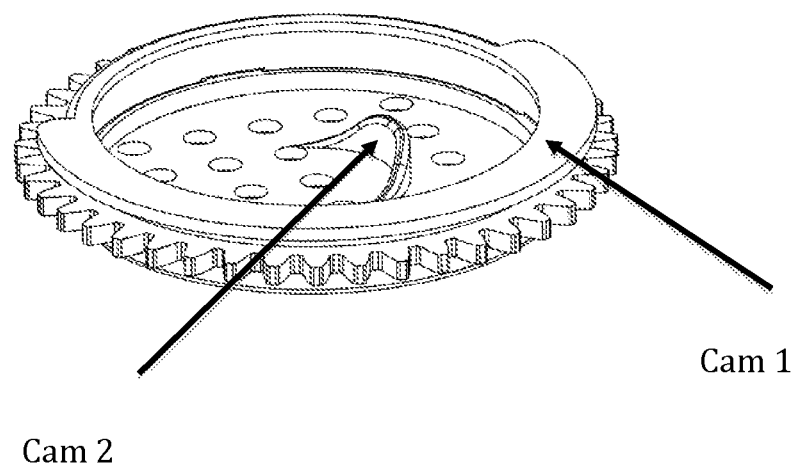
FIG. 6 shows one embodiment of a perspective view of the gear system.

FIG. 5 shows clearly how to operate (open and close) the piston valve (4) when an optimal temperature is reached in the hot water chamber. In one embodiment, the default position of the valve piston (4) opens the flow path from cold water chamber to hot water chamber (1) but closes the flow path from the hot water chamber (2) to filter basket (5) (FIG. 5A). Under this condition, water can fill up both water chambers. After the machine is turned on, the heating system (3) will heat up the cold water in the hot water chamber (2). in one embodiment, an electronic temperature sensor built in the hot water chamber (2) would monitor the water temperature. When the water reaches an optimal temperature, the heating system (3) will be turned off. The motor gear system (13) will begin to rotate the gear system (15). Once the gear system rotates to a proper position and activates the micro switch by a cam of the gear system, the gear system will stop the motor gear system (13) from rotating (FIG. 5B) and another cam on top of this gear system (15) will push the piston valve upward. This opens the flow path between the hot water chamber (2) and filter basket (5) and closes the flow path between the cold water chamber (1) and hot water chamber (2), i.e. hot water can flow out of the hot water chamber to the filter basket but cold water from the cold water chamber cannot flow into the hot water chamber to prevent the dilution of the hot water by the cold water.

In one embodiment, the present invention provides a brewing machine comprising: (a) one or more cold water chambers and one or more hot water chambers, the cold water chambers are attached to the hot water chambers, and the water chambers are located on top of the machine; (b) a pour over system located beneath each hot water chamber(s); (c) a filter basket located beneath each pour over system; and (d) a valve controlling water flow (i) between the cold water chamber(s) and the hot water chamber(s) and (ii) between the hot water chamber(s) and the filter basket.

In another embodiment, the present invention provides a brewing machine comprising: (a) one or more hot water chambers located on top of the machine; (b) a pour over system located beneath each hot water chamber(s); (c) a filter basket located beneath each pour over system; and (d) a valve controlling water flow between the hot water chamber(s) and the filter basket.

In one embodiment, the hot water chamber(s) comprises a temperature sensor and a heating system. In one embodiment, the temperature sensor turns the heating system on or off at pre-determined temperatures.

In one embodiment, the valve is controlled by a gear system comprising one or more cams. In one embodiment, the gear system rotates under the control of a motor gear system comprising a motor, a micro switch, and gears.

In one embodiment, the motor gear system begins to rotate at the same time when the heating system is turned on or off. In another embodiment, the motor gear system stops rotating when the micro switch is hit by a cam of the gear system.

In one embodiment, the valve is a piston valve.

In one embodiment, when the valve opens a flow path from the cold water chamber(s) to the hot water chamber(s), water flow from the hot water chamber(s) to the filter basket is stopped.

In one embodiment, when the valve closes a flow path from the cold water chamber(s) to the hot water chamber(s), water is allowed to flow from the hot water chamber(s) to the filter basket.

In one embodiment, when the valve opens a flow path from the cold water chamber(s) to the hot water chamber(s), and stops water flow from the hot water chamber(s), the cold and hot water chambers can be filled up with water.

In one embodiment, the cold water chamber(s) is placed on top of the hot water chamber(s).

In one embodiment, water flows from the cold water chamber(s) to the hot water chamber(s) by gravity.

In one embodiment, heated water flows from the hot water chamber(s) to the filter basket by gravity via the pour over system. In one embodiment, said pour over system comprises one or more dispensing channel and at least one drain hole.

What is claimed is:

1. A coffee brewing machine comprising:
   a. one or more hot water chambers that are located on top of the machine, wherein each hot water chamber contains water for a specific amount of coffee to be brewed in a single brewing cycle;
   b. a pour over system located beneath each hot water chamber(s);
   c. a filter basket located beneath each pour over system; and d. a valve configured to control water flow between the hot water chamber(s) and the filter basket, wherein the valve is controlled by a gear system comprising one or more cams, the gear system rotates under the control of a motor gear system comprising a motor, a micro switch, and gears; wherein at least one of said hot water chamber(s) comprises a temperature sensor and a heating system, said temperature sensor configured to turn the heating system on or off to keep water in said hot water chamber(s) at 92 to 96° C. and said motor gear system is configured to begin to rotate at the same time when the heating system is turned on or off to control opening or closing of said valve, the motor gear system is configured to stop rotating when the micro switch is hit by a first cam integrated in the gear system; wherein said valve is configured to open when a second cam integrated in the gear system activates a valve piston of said valve, and said water at 92 to 96° C. is configured to flow immediately from the one or more hot water chambers to the filter basket by gravity via the pour over system, said water configured to directly contact ground coffee to extract coffee beverage.

2. The coffee brewing machine of claim 1, further comprises one or more cold water chambers attached to the hot water chambers.

3. The coffee brewing machine of claim 2, wherein said cold water chambers are located on top of the hot water chambers.

4. The coffee brewing machine of claim 2, wherein a valve controls water flow between the cold water chamber(s) and the hot water chamber(s).

5. The coffee brewing machine of claim 4, wherein when the valve opens a flow path from the cold water chamber(s) to the hot water chamber(s), water flow from the hot water chamber(s) to the filter basket is stopped.

6. The coffee brewing machine of claim 4, wherein when the valve closes a flow path from the cold water chamber(s) to the hot water chamber(s), water is allowed to flow from the hot water chamber(s) to the filter basket.

7. The coffee brewing machine of claim 4, wherein when the valve opens a flow path from the cold water chamber(s) to the hot water chamber(s), and stops water flow from the hot water chamber(s), the cold and hot water chambers can be filled up with water.

8. The coffee brewing machine of claim 4, wherein water flows from the cold water chamber(s) to the hot water chamber(s) by gravity.

9. The coffee brewing machine of claim 1, wherein said pour over system comprises one or more dispensing channel and at least one drain hole.

* * * * *